May 24, 1966 R. H. HANSEN 3,253,065
PREPARATION OF EXPANDED POLYMERS
Filed Aug. 7, 1963
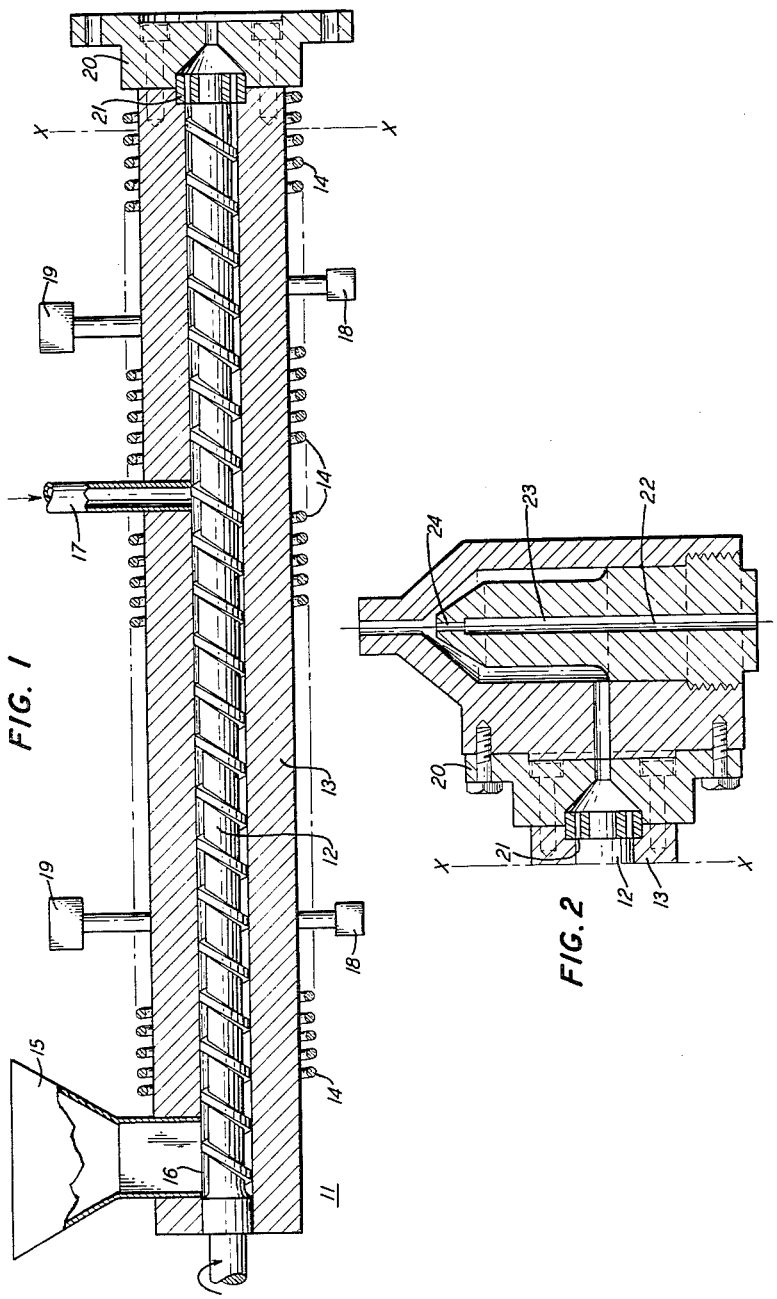
INVENTOR
R.H. HANSEN
BY
Edward M. Fink
ATTORNEY

United States Patent Office 3,253,065
Patented May 24, 1966

3,253,065
PREPARATION OF EXPANDED POLYMERS
Ralph H. Hansen, Short Hills, N.J., assignor to Bell Telephone Laboratories, Incorporated, New York, N.Y., a corporation of New York
Filed Aug. 7, 1963, Ser. No. 300,583
19 Claims. (Cl. 264—47)

This invention relates to a process for the preparation of expanded polymers and to the polymeric compositions so produced. More particularly, the present invention relates to a technique for preparing cellular polymeric bodies having a uniform distribution of fine cells, such bodies being of particular interest for use in electrical insulating applications.

In accordance with the present invention, a dispersion of nucleation centers is introduced into or prepared in a molten thermoplastic material having a gas dissolved therein under pressure, and the resultant mixture transferred into a zone of lower pressure wherein nucleation of the dissolved gas occurs, so resulting in the formation of an expanded thermoplastic material.

The nucleation centers described herein evidence a thermal conductivity greater than the specific heat less than that of the thermoplastic material and are insoluble therein. These nucleation centers act as sources of the thermal energy required for the desorption process, and in one embodiment the heat centers result from metal particles introduced into the thermoplastic material either in elemental form or in a compound which is capable of yielding the elemental metal as, for example, by decomposition upon the application of energy, such as thermal or mechanical energy. The second type of nucleation center results from the introduction of a finely divided alloy into the thermoplastic material.

In a specific embodiment, the present invention is directed to a technique for extruding compositions of the type described about a wire conductor.

The invention will be more readily understood from the following detailed description read in conjunction with the accompanying drawing wherein:

FIG. 1 is a cross-sectional view of an extruder suitable for the practice of the present invention; and FIG. 2 is a cross-sectional view of a typical wire covering crosshead die used in extruding expanded polymers about a wire conductor.

With reference now more particularly to FIG. 1, there is shown an extruder 11 having a forwarding screw 12 rotatably mounted in barrel 13 heated by means of electrical resistance heaters 14. The barrel of the extruder is fitted with a tangentially situated feed hopper 15 having feed port 16 situated at the base thereof, inlet 17 for the introduction of gas therethrough, thermocouples 18, pressure gauges 19 and die 20. The die of the extruder is fitted with a breaker plate 21 which is placed between the end of screw 21 and die 20 in order to assist in the build-up of a pressure gradient along the length of the screw. The screw of the extruder may be driven by any suitable means, for example, an electric motor, not shown.

In the operation of the process for preparing cellular polymeric compositions, the polymer admixed with discrete particulate matter comprising an elemental metal, a compound capable of decomposing to yield an elemental metal, or an alloy, evidencing a thermal conductivity greater than the specific heat less than that of the thermoplastic material, is fed into the extruder through hopper 15 and feed port 16. Screw 12 driven by suitable means takes the mixture of polymer and particulate matter from the feed port through barrel 13 which is heated by means of electrical resistance heaters 14. During this period, the mixture is forced into intimate and substantially sliding contact with the hot barrel walls and is also sheared and worked whereby frictional effects are produced. The combined effects of the heated barrel and the heat due to internal friction in the material cause the thermoplastic mass to be molten by the time it has traveled approximately one-fourth of the distance of the extruder barrel, so assuring that it may be forced through the restriction to the extrusion die where it is given the desired form.

The molten mixture proceeds through barrel 13 and enters a low pressure area in the neighborhood of gas inlet 17, at which point a selected gas, under pressure, is admitted to the system. It will be appreciated that the low pressure alluded to is not a requirement of the present inventive technique, but is merely a convenient means for the introduction of a gas. As the molten mixture continues along its path through barrel 13 toward breaker plate 21, the gas so admitted enters solution. The molten solution of gas in thermoplastic material containing the dispersion of particulate matter next passes from a high pressure area to a low pressure area as it emerges from the die. Nucleation or seeding of the now supersaturated solution of gas in polymer is attained at the sites of the discrete particulate matter having the noted properties such that these sites function as sources of thermal energy and facilitate the initial endothermal desorption of the dissolved gas with the concomitant formation of a plurality of internal gas-liquid interfaces, i.e. bubbles. The remainder of the dissolved gas diffuses rapidly to internal and external surfaces where it exits from solutions.

As noted, it is highly desirable that a uniform distribution of fine cells be attained in order to achieve the desired level of efficiency. Ultimate cell size depends primarily on the amount of dissolved gas and the number of nucleated bubbles in addition to the competition for dissolved gas between the internal surfaces created by the nucleated bubbles and the external surface of the object being expanded. In the described situation, many bubbles are initiated by the discrete particulate matter in the extrudate and the ratio of the total internal surface area to the external surface area is greater and thus more favorable for retention and utilization of the dissolved gas. The existence of such a favorable surface area results in greater efficiency since a proportionately greater amount of gas separates from the liquid phase by diffusing to the bubble surfaces and, thus, the amount of gas lost by diffusion to the external surface is smaller.

The discrete particulate matter employed in the practice of the invention is insoluble in the polymer and manifests thermal conductivities within the range of 0.01 to 1.0 cal./sec./cm./cm.$^2$ and specific heats within the range of 0.03 to 0.3 cal./g., respectively. Typical elements employed in this use are metals such as lead, silver, zinc, tin, mercury, aluminum, copper, palladium, bismuth, et cetera. Typical alloys are Wood's metal, molybdenum-Permalloy, etc. Alternatively, it may be desirable in selected cases to employ a metal compound which decomposes to yield an elemental metal. Typical materials suitable in this use are certain metal acetates, halides, oxalates, et cetera.

In all cases studied, it has been determined that superior nucleation of injected gases occurs when a discrete particulate material such as a metal or alloy is maintained at any temperature greater than its melting point. Nucleation of dissolved gas by discrete particulate matter, whether liquid or solid, permits temperature independence in the operation of the process, a significant advantage from an engineering standpoint.

Although the particle size of the particulate material is not considered critical, a general preference exists for fine particles. It has been found that material finer than 80 mesh containing particles ranging from an average of less than 0.01 micron to an average of more than 80 microns is satisfactory.

The particulate material is generally employed in an amount within the range of 0.005 to 10 percent based on the weight of the polymer, a preferred range being about 0.1 to 3.5 percent. The use of amounts appreciably less than the noted minimum produces a less satisfactory degree of nucleation whereas the use of amounts appreciably beyond the noted maximum tends to impair dielectric properties and is considered less practical.

The polymer suitable for use in the present invention may be any normally solid polymer or mixture of polymers obtained by polymerizing or copolymerizing aliphatic olefins such as ethylene, propylene, or mixtures thereof, halogenated aliphatic olefins such as vinyl chloride, unsaturated aromatic hydrocarbons such as styrene, unsaturated esters such as methyl methacrylate, et cetera.

The gas which is employed in the practice of the invention must be soluble in the polymer being expanded at the conditions of temperature and pressure within the process equipment, less soluble in the polymer after leaving the equipment, and must be able to diffuse to bubble surfaces at a rate which is compatible with the generation of bubbles by nucleation. All ordinary gases meet these conditions. Suitable gases in this use are argon, nitrogen, helium, air, carbon dioxide, et cetera. The gas so employed is admixed under a pressure within the range of about 500 to about 2,500 p.s.i. under conditions such that the molten thermoplastic material is essentially saturated.

A general outline of the methods herein described and the ranges of operating parameters will now be given.

In the practice of the invention, a dispersion of particulate material in polymer is obtained by charging the ingredients to a suitable mixing device such as a paint mixer, et cetera, and thoroughly admixing for several minutes. After a thorough dispersion or admixture is obtained, the composition is fed directly to the feed hopper of an extruder such as the type shown in FIG. 1.

The composition is next charged to the barrel of the extruder, which has been preheated to a temperature slightly above the softening point of the polymer, typically from 100° C. to 150° C. for a polyolefin such as polyethylene, wherein it is thoroughly worked and fed therealong by means of the screw. Temperatures may vary from the softening point of the polymer to the decomposition temperature thereof, so permitting wide latitude in the selection of operating conditions. Further, the process is independent of residence time and practical considerations dictate selection.

After traveling approximately one-fourth of the distance of barrel 13, the mixture becomes molten. The molten mixture then continues through the barrel and as it approaches vent 17 a suitable gas soluble in the polymer is admitted under pressure. The mixture then proceeds toward the breaker plate which restricts its flow and creates a back pressure, typically within the range of 1,000 to 6,000 p.s.i., so preventing the injected gas from expanding.

As the composition passes through the breaker plate, it is led to a forming section comprising a die and, subsequently passes through an orifice into an area of reduced pressure, usually the atmosphere, wherein dissolution of the dissolved gas and expansion of the polymer occurs.

In certain applications it is convenient to arrange the die body and die of the extruder in such manner that the extrudate leaves the extruder and is taken off in a direction perpendicular to the axis of the screw. This type of die is known as a crosshead and is used in processes in which it is desired to introduce a continuous filament to the die, as in the case of a wire conductor.

FIG. 2 is a cross-sectional view of a typical wire covering crosshead employed in such applications. There is shown in the figure breaker plate assembly 21, wire 22, wire guide 23 and wire guide mandrel 24. In this type of apparatus, the molten thermoplastic material is forced through the breaker plate assembly and is conducted to the wire guide mandrel or point 24 which is shaped so that the composition flows around either side of it and joins again on the side remote from the supply. The complete annulus of material then flows toward the die orifice and ultimately contacts the wire. In this manner, a tube of plastic material is deposited over the wire which moves continuously through the crosshead and acts as an internal forming mandrel.

The following examples will more fully illustrate the described technique.

*Example I*

(a) 1,000 grams of polyethylene granules having a density of 0.92 g./cm.$^3$ at 20° C. and a melt index at 190° C. of 0.2 to 0.4 and 10 grams of lead powder having an average particle size of about 5 to 10 microns were inserted into a paint mixer and thoroughly admixed. The resultant mixture was then charged to the hopper of a screw extruder of the type shown in FIG. 1, the barrel having been preheated to a temperature ranging from about 210° C. near the hopper to 250° C. near the gas inlet port to about 260° C. near the breaker plate with argon flowing therethrough under a pressure of 800 p.s.i. The breaker plate positioned at the discharge end of the barrel of the extruder was employed to restrict the flow of the molten solution of argon in polyethylene, so creating a back pressure of approximately 2,400 p.s.i. Thereafter, the molten polyethylene passed through the head and die of the extruder and through an orifice into the atmosphere wherein it expanded to form a cellular mass. The resultant polyethylene evidenced a uniform distribution of fine cells having an average diameter of less than 15 mils.

(b) The procedure of Example I (a) was repeated with the exception that nitrogen was employed at a pressure of 600 p.s.i. and the extruder was maintained at temperatures ranging from 300° C. at the rear to 350° C. at the head, such temperatures being greater than the melting point of lead. The resultant polyethylene evidenced a uniform distribution of fine cells having an average diameter of less than 3 mils.

(c) For comparative purposes the procedure of Example I (a) was repeated in the absence of the lead powder. The resultant polyethylene was poorly expanded and evidenced a random distribution of blisters rather than cells, such blisters having an average diameter of approximately 70 mils.

*Example II*

(a) 1,000 grams of polyethylene having a density of 0.92 g./cm.$^3$ at 20° C. and a melt index at 190° C. of 0.2 to 0.4 and 35 grams of silver oxalate having an average particle size of about 20 microns were inserted into a paint mixer and thoroughly admixed. The resultant mixture was then charged to the hopper of a screw extruder of the type shown in FIG. 1, the barrel having been preheated to a temperature ranging from about 210° C. near the hopper to 260° C. near the gas inlet port with argon flowing therethrough under a pressure of 1,000 p.s.i. to about 270° C. near the breaker plate, such temperatures being sufficient to cause decomposition of the silver oxalate. The breaker plate positioned at the discharge end of the barrel of the extruder was employed to restrict the flow of the molten solution of argon in polyethylene, so creating a back pressure of 1,780 p.s.i. Thereafter, the molten polyethylene passed through the head and die of the extruder and through an orifice into the atmosphere wherein it expanded to form a cellular mass. The resultant polyethylene evidenced a uniform distribution of fine cells having an average diameter of less than 5 mils.

(b) For comparative purposes the procedure of Example II (a) was repeated in the absence of silver oxalate. The resultant polyethylene was blistered and very few but very large cells were present.

For convenience and brevity the following examples are set forth in tabular form. Each set of data represents an independent example in which the general procedure described above was followed.

TABLE I

| Ex. | Thermoplastic Material (g.) | Nucleator (g.) | Gas | Gas Pressure (p.s.i.) | Temperatures ° C. Rear | Temperatures ° C. Middle | Temperatures ° C. Head (Die) | Pressure Head (p.s.i.) | Remarks |
|---|---|---|---|---|---|---|---|---|---|
| 3 | Polyethylene, 1,000 g | Hg₂Cl₂, 10 g | Argon | 600 | 184 | 297 | 298 | 1,650 | Uniform distribution of fine cells having an average diameter of 8-10 mils. |
| 4 | ___do___ | None | ___do___ | 600 | 168 | 158 | 176 | 3,210 | Few cells having average diameter of 48 mils. |
| 5 | ___do___ | Hg₂Cl₂, 10 g | ___do___ | 600 | 166 | 155 | 174 | 3,100 | Many fine cells having average diameter of 10-12 mils. |
| 6 | ___do___ | Ag dust, 10 g | ___do___ | 800 | 208 | 252 | 257 | 2,400 | Uniform distribution of fine cells having average diameter of 15 mils. |
| 7 | ___do___ | None | ___do___ | 800 | 208 | 252 | 257 | 2,400 | Few cells having average diameter of 50-70 mils. |
| 8 | ___do___ | Zn dust, 10 g | Nitrogen | 600 | 280 | 288 | 294 | 1,000 | Uniform distribution of fine cells having average diameter of 5-8 mils. |
| 9 | ___do___ | None | ___do___ | 600 | 280 | 288 | 294 | 1,000 | Few cells having average diameter of 50 mils. |
| 10 | ___do___ | Wood's Metal, 5 g | ___do___ | 1,000 | 209 | 250 | 238 | 1,000 | Uniform distribution of fine cells having average diameter of 3 mils. |
| 11 | ___do___ | None | ___do___ | 1,000 | 209 | 230 | 238 | 1,000 | Few cells having average diameter of 40 mils. |
| 12 | ___do___ | Mo-Permalloy: 81% Ni; 2% Mo; 17% Fe; 10 g. | ___do___ | 1,750 | 199 | 244 | 199 | 1,200 | Uniform distribution of fine cells having average diameter of 1-2 mils. |
| 13 | Teflon FEP Resin, 1,000 g. | Pb Powder, 5 g | ___do___ | <800 | ~350 | ~370 | ~370 | ~2,500 | Uniform distribution of fine cells having average diameter of 3-6 mils. |
| 14 | ___do___ | None | ___do___ | <800 | ~350 | ~370 | ~370 | ~2,500 | Few cells having average diameter of 15 mils. |
| 15 | Polystyrene, 1,000 g | Sn Powder, 10 g | ___do___ | 850 | 186 | 212 | 202 | 850 | Uniform distribution of fine cells having an average diameter of 3 to 7 mils. |
| 16 | ___do___ | None | ___do___ | 880 | 186 | 212 | 202 | 850 | Few coarse cells having an average diameter of 30 to 40 mils. |
| 17 | Polymethyl methacrylate, 1,000 g. | Sn Powder, 10 g | ___do___ | 850 | 185 | 222 | 216 | 900 | Uniform distribution of fine cells having an average diameter of 3 to 7 mils. |
| 18 | ___do___ | None | ___do___ | 850 | 185 | 222 | 216 | 900 | Very few coarse cells having an average diameter of 30 to 40 mils. |

TABLE II

| Ex. | Thermoplastic Material (g.) | Nucleator (g.) | Gas | Gas Pressure (p.s.i.) | Temperature, ° C. Middle | Temperature, ° C. Breaker Plate | Temperature, ° C. Head (die) | Pressure Head (p.s.i.) | Wire Speed, ft./min. | Results |
|---|---|---|---|---|---|---|---|---|---|---|
| 15 | Polyethylene density=0.92 g. cm.³ at 23° C., 1,000 g. | Pb Powder, 10 g | Argon | 1,800 | 180 | 213 | 179 | 2,350 | 71 | Uniform distribution of fine cells, average size 6-8 mils, Expansion 20.0%. |
| 16 | ___do___ | ___do___ | Helium | 1,800 | 179 | 213 | 180 | 2,550 | 74 | Uniform distribution of fine cells, average size 6-9 mils, Expansion 22.5%. |
| 17 | ___do___ | Hg₂Cl₂, 10 g | Nitrogen | 1,800 | 179 | 212 | 176 | 2,530 | 50 | Uniform distribution of fine cells, average size 1-2 mils, Expansion 34.2%. |
| 18 | ___do___ | Wood's Metal, 10 g | Argon | 1,800 | 179 | 213 | 179 | 2,460 | 110 | Uniform distribution of fine cells, average size 2-3 mils, Expansion 32.5%. |
| 19 | ___do___ | Zn dust, g | ___do___ | 1,800 | 180 | 214 | 179 | 2,640 | 61 | Uniform distribution of fine cells, average size 5-7 mils, Expansion 27.5%. |
| 20 | ___do___ | Sn, 10 g | ___do___ | 1,800 | 179 | 214 | 179 | 2,550 | 64 | Uniform distribution of fine cells, average size 8 mils, Expansion 25.8%. |
| 21 | ___do___ | Sn, 10 g | ___do___ | 1,700 | 253 | 240 | 203 | 2,500 | 59 | Uniform distribution of fine cells, average size 2 mils, Expansion 31.7%. |
| 22 | ___do___ | Ag, 10 g | ___do___ | 1,770 | 180 | 214 | 180 | 2,550 | 63 | Uniform distribution of fine cells, average size 6-8 mils, Expansion 26.5%. |
| 23 | ___do___ | Silver Oxalate, 10 g. | Nitrogen | 1,730 | 171 | 200 | 173 | 2,650 | 63 | Uniform distribution of fine cells, average size 2-4 mils. |
| 24 | ___do___ | Mercuric acetate, 10 g. | ___do___ | 2,000 | 260 | 207 | 214 | 3,200 | 63 | Uniform distribution of fine cells, average size 2-4 mils. |
| 25 | Marlex 5,000 density=0.96 g. cm.³ 1,000 g. | Sn, 10 g | Argon | 650 | 258 | 240 | 202 | 1,950 | 15 | Uniform distribution of fine cells, average size 1-2 mils, Expansion 28.7%. |
| 26 | Poly(vinyl chloride) density=1.31 g. cm.³ 1,000 g. | Wood's Metal, 10 g | Nitrogen | 1,850 | 199 | 169 | 141 | 2,500 | 61 | Uniform distribution of fine cells, average size 1-2 mils. |
| 27 | Polypropylene density=0.91 g. cm.³ 1,000 g. | Mercuric Oxalate, 10 g. | ___do___ | 1,200 | 209 | 220 | 190 | 2,000 | 50 | Uniform distribution of fine cells, average size 1-2 mils. |

The procedure described in the foregoing examples was repeated with the exception that a wire covering crosshead die of the type shown in FIG. 2 was employed, a 19 gauge copper conductor of 10 mils diameter being passed therethrough at varying speeds. Again, for brevity and convenience, the results have been set forth in tabular form, each set of data representing an independent example.

While the invention has been described in detail in the foregoing specification and the drawing similarly illustrates the same, the aforesaid is by way of illustration only and is not restrictive in character. The several modifications which will readily suggest themselves to persons skilled in the art are all considered within the scope of the invention, reference being had to the appended claims.

What is claimed is:

1. A method for the preparation of a cellular thermoplastic body which comprises the steps of heating a thermoplastic body in admixture with discrete particulate matter in an amount within the range of 0.005 to 10.0 percent by weight of said thermoplastic body to a temperature in excess of the softening point of said thermoplastic body under a pressure within the range of about 500–2,500 p.s.i. of a gas soluble in the resultant molten thermoplastic material, the said gas essentially saturating said thermoplastic material, and extruding the resultant composition into a zone of lower pressure under conditions such that the molten thermoplastic material is supersaturated with respect to the said gas, the nature of the particulate matter being such that it evidences a thermal conductivity within the range of 0.001 to 1.0 cal./sec./cm./cm.$^2$ and specific heat within the range of 0.003 to 0.3 cal./g., whereby gas leaving solution nucleates at the sites of the said particulate matter.

2. A method in accordance with the procedure of claim 1 wherein said discrete particulate matter is a liquid at temperature less than the processing temperature of said thermoplastic body.

3. A method in accordance with the procedure of claim 1 wherein said cellular thermoplastic body is extruded directly about an electric conductor.

4. A method in accordance with the procedure of claim 1 wherein said discrete particulate matter is selected from the group consisting of elemental metals, alloys, and metal compounds capable of decomposing to yield elemental metals during the processing of said thermoplastic material, the said particulate matter being finer than 80 mesh and containing particles ranging from an average of 0.01 to 80 microns.

5. A method in accordance with the procedure of claim 1 wherein said discrete particulate matter is employed in an amount within the range of 0.1 to 3.5 percent by weight of said thermoplastic body.

6. A method in accordance with the procedure of claim 1 wherein said thermoplastic material is polyethylene.

7. A method in accordance with the procedure of claim 1 wherein said thermoplastic body is poly (vinyl chloride).

8. A method in accordance with the procedure of claim 1 wherein said thermoplastic body is polypropylene.

9. A method in accordance with the procedure of claim 1 wherein said thermoplastic body is a fluorinated ethylene propylene copolymer.

10. A method in accordance with the procedure of claim 4 wherein said thermoplastic body is polyethylene.

11. A method in accordance with the procedure of claim 4 wherein said thermoplastic body is polystyrene.

12. A method in accordance with the procedure of claim 4 wherein said thermoplastic body is polymethyl methacrylate.

13. A method in accordance with the procedure of claim 4 wherein said thermoplastic body is poly (vinyl chloride).

14. A method in accordance with the procedure of claim 4 wherein said thermoplastic body is polypropylene.

15. A method in accordance with claim 4 wherein said discrete particulate material is elemental lead.

16. A method in accordance with claim 4 wherein said discrete particulate material is elemental tin.

17. A method in accordance with claim 4 wherein said discrete particulate material is silver oxalate.

18. A method in accordance with claim 4 wherein said discrete particulate material is mercuric chloride.

19. A method in accordance with claim 4 wherein said discrete particulate material is Wood's metal alloy.

References Cited by the Examiner

UNITED STATES PATENTS

| | | | |
|---|---|---|---|
| 2,512,463 | 6/1950 | Maier | 264—53 XR |
| 2,928,130 | 3/1960 | Gray | 264—50 |

FOREIGN PATENTS

| | | |
|---|---|---|
| 641,073 | 5/1962 | Canada. |
| 854,586 | 11/1960 | Great Britain. |

OTHER REFERENCES

Collins, F. H.: "Controlled Density Polystyrene Foam Extrusion." In SPE Journal, July 1960, pp. 705–709.

ALEXANDER H. BRODMERKEL, *Primary Examiner.*

P. E. ANDERSON, *Assistant Examiner.*